(12) United States Patent
Leibler et al.

(10) Patent No.: US 6,680,111 B1
(45) Date of Patent: Jan. 20, 2004

(54) COMPOSITE MATERIALS CONTAINING AN IMPACT-RESISTANT FILM

(75) Inventors: Ludwik Leibler, Paris (FR); Gilles Meunier, Mazerolles (FR); Bruno Vuillemin, Billere (FR); Francis Verzaro, Serres-Castet (FR); Jean-Marc Boumera, Serres-Sainte-Marie (FR)

(73) Assignee: At fina, Puteaux (FR)

( * ) Notice: Subject to any disclaimer, the term of this patent is extended or adjusted under 35 U.S.C. 154(b) by 0 days.

(21) Appl. No.: 09/914,237

(22) PCT Filed: Feb. 16, 2000

(86) PCT No.: PCT/FR00/00381
§ 371 (c)(1),
(2), (4) Date: Dec. 7, 2001

(87) PCT Pub. No.: WO00/50496
PCT Pub. Date: Aug. 31, 2000

(30) Foreign Application Priority Data

Feb. 26, 1999 (FR) .............................. 99 02397

(51) Int. Cl.[7] .......................... B32B 17/10; C08J 7/04; C03C 17/34
(52) U.S. Cl. ...................... 428/327; 428/412; 428/442; 428/520; 428/522
(58) Field of Search .................. 428/412, 442, 428/520, 327, 522; 523/201, 202, 205, 206

(56) References Cited

U.S. PATENT DOCUMENTS

| 2,092,389 A | 9/1937 | Colvin |
| 2,159,882 A | 5/1939 | Borden |
| 5,015,523 A | 5/1991 | Kawashima et al. ........ 428/336 |
| 5,316,791 A | 5/1994 | Farber et al. ............... 427/464 |

FOREIGN PATENT DOCUMENTS

| EP | 0 035 609 | 9/1981 |
| EP | 0 404 111 | 12/1990 |
| EP | 0 600 597 | 6/1994 |
| EP | 0 661 306 | 12/1994 |
| EP | 0 811 478 | 12/1997 |
| FR | 2 767 835 | 8/1997 |
| JP | 6387223 | 4/1988 |
| JP | 6314001 | 11/1994 |
| WO | WO 83/0125 | 1/1983 |

OTHER PUBLICATIONS

"Properties of Polymers", D.W. Van Krevelen, 1990, 3rd edition, pp. 200.
Verified Translation of the previously submitted PCT International Preliminary Examination Report (PCT/IPEA/416 and 409).
Translation of Reference to Ministerial Decree of Jun. 20, 1983 relating to vehicle windows, pp. 6959–6960.

*Primary Examiner*—D. S. Nakarani
(74) *Attorney, Agent, or Firm*—Smith, Gambrell & Russell, LLP

(57) ABSTRACT

The invention describes a composite material comprising a substrate having, on at least one of its faces, an impact-resistant primer layer and at least one abrasion-resistant coating layer deposited on the primer layer. The primer layer is obtained by applying, to the surface to be treated, a latex consisting of structured particles of polymers having a range with a "soft" character ($T_g<20°$ C.) and another range with a "hard" character ($T_g>50°$ C.).

The composite material described is intended for various industries, such as the automobile industry (windows, headlights, etc.), the building industry (windows) or the sanitaryware industry.

16 Claims, No Drawings

COMPOSITE MATERIALS CONTAINING AN IMPACT-RESISTANT FILM

FIELD OF THE INVENTION

The invention relates to the field of composite materials and more particularly to composite materials comprising, on at least one of their surfaces, an impact-resistant primer layer and at least one abrasion-resistant (scratch-resistant) coating layer deposited on the primer layer. The impact-resistant primer layer is formed from polymer particles dispersed in water. The scratch-resistant coating may consist, for example, of a photocrosslinkable or thermally crosslinkable varnish according to EP 0,035,609 or WO 83/0125. The composite materials intended by the present invention are intended for various applications. By way of non-limiting indication, applications in the building industry, such as windows, in the automobile industry, such as windows and headlight lenses, and in the sanitaryware industry, such as shower trays and bathtubs, may be mentioned.

BACKGROUND OF THE INVENTION

Known composite materials have their impact-resistance properties altered by the presence of a hard surface layer. Moreover, in certain applications good solvent resistance is demanded.

It is well known that those composite materials intended for the applications described above with no primer layer have a low impact resistance and a limited resistance to the action of solvents when these composite materials are under stress ("stress cracking").

The prior art discloses impact-resistant layers of various kinds. Thus, Japanese patents 6,314,001 and 6,387,223 describe an impact-resistant primer layer based on a thermoplastic polyurethane resin.

U.S. Pat. No. 5,015,523 recommends the use of acrylic impact-resistant primers, however European Patent EP-0, 404,111 describes the use of impact-resistant primers based on a thermosetting polyurethane.

Document U.S. Pat. No. 5,316,791 describes the use of an impact-resistant primer layer formed from an aqueous polyurethane dispersion applied directly to one surface of an organic glass substrate. The impact-resistant primer layer may be obtained by drying and curing, in air, an aqueous dispersion or latex of a polyurethane which may possibly contain an anionically stabilized acrylic emulsion.

Although these impact-resistant primer layers of the prior art ensure both acceptable adhesion of the abrasion-resistant hard coating and a degree of impact resistance, the latter is not sufficient for the applications intended.

DESCRIPTION OF THE INVENTION

It has now been found that it is possible to improve the impact-resistance of composite materials by using, for the impact-resistant primer layer, an aggregate of multiphase structured particles, one of the phases of which is formed by a polymer having a soft character and another phase is formed by a polymer having a hard character, these phases having glass transistion temperatures lying within defined ranges.

According to the invention, a multilayer composite material is produced which comprises a substrate, at least one impact-resistant primer layer deposited on at least one of the faces of the substrate, and at least one abrasion-resistant coating layer deposited on the primer layer, characterized in that the said primer layer comprises an aggregate of multiphase polymer particles, each particle comprising two separate phases:

a first phase formed by a polymer P1 with a soft character having a glass transition temperature ($T_g1$) below 20° C., and a second phase formed by a polymer P2 with a hard character having a glass transition temperature ($T_g2$) above 50° C.

Preferably, the particles are two-phase particles and possess a core/shell structure.

Preferably, the core contains the polymer P1 and the shell contains the polymer P2.

Also preferably, the polymer P1 has a $T_g1$ below 0° C. and the polymer P2 has a $T_g2$ above 60° C.

Again preferably, the polymer P1 is dispersed in the form of nodules in a matrix formed by the polymer P2.

Preferably, the polymer P1 has a hydrophobicity greater than that of the polymer P2.

In general, the impact-resistant primer layer consists of 70 to 90% by weight of the polymer P1 with a soft character and 10 to 30% by weight of the polymer P2 with a hard character.

Advantageously, the polymers P1 and P2 of the primer layers according to the invention contain:

90 to 100% by weight of units obtained by the polymerization of at least one monomer chosen from the group (I) consisting of ($C_1$–$C_8$)alkyl esters of (meth)acrylic acid, such as methyl (meth)acrylate and butyl (meth)acrylate; vinyl esters of linear or branched carboxylic acids, such as vinyl acetate and vinyl stearate; styrene; alkylstyrenes, such as α-methylstyrene; haloalkylstyrenes, such as chloromethylstyrene; conjugated dienes, such as butadiene and isoprene; (meth)acrylamide; acrylonitrile; vinyl chloride; (meth)acrylic acids and their derivatives, such as anhydrides; and 0 to 10% by weight of units obtained by the polymerization of at least one monomer chosen from the group (II) consisting of allyl esters of α, β-unsaturated monocarboxylic or dicarboxylic acids, such as allyl acrylate, allyl methacrylate and diallyl maleate; conjugated dienes, such a butadiene and isoprene; polyol poly(meth)acrylates, such as ethylene glycol dimethacrylate, 1,3-butylene glycol diamethacrylate, 1,4-butenediol diacrylate and pentaerythritol tetraacrylate; polyvinylbenzenes, such as divinylbenzene or trivinylbenzene; and polyallyl derivatives, such as triallyl cyanurate and triallyl trimesate.

The monomers of group (II) act as crosslinking agents in the polymers P1 and P2.

In general, the polymer P1 with a soft character consists mostly of units coming from the polymerization of at least one monomer chosen from butyl acrylate, butadiene and isoprene, however the polymer P2 with a hard character in general consists mostly of units coming from the polymerization of at least one monomer chosen from methyl methacrylate, styrene and vinyl chloride.

In the case of a core/shell structure, preferably only the core is crosslinked, the preferred crosslinking monomers being butadiene and 1,4-butanediol diacrylate and the content of crosslinking monomers being between 0 and 10% by weight with respect of the total weight of the particles.

The hard polymer P2 may be grafted directly onto the polymer P1 or by introducing into the latter residues of monomer units. These residues of monomer units are obtained by the incorporation, into the soft polymer P1, of grafting monomers chosen either from conjugated dienes, the residues of monomer units resulting from the partial 1,2-incorporation of the diene during polymerization, or from allyl esters of α, β-unsaturated carboxylic or dicarboxylic acids, which possess two copolymerizable functional groups of different reactivities.

The preferred grafting monomers according to the invention are butadiene, allyl methacrylate and diallyl maleate.

The polymers P1 and P2 according to the invention may be prepared by two-step emulsion polymerization, as described below, using monomers chosen from group (I) and possibly group (II) above.

The selection of the monomers both for the soft polymer P1 and for the hard polymer P2 depends on properties, such as the hydrophobicity and the glass transition temperature, that it is desired to confer on the polymers in question.

The primer layer according to the invention may be obtained in particular from a latex containing particles of the polymers P1 and P2, particularly hydrophobic and core/shell-structured polymers P1 and P2. When the mass contribution of the shell in total weight of the polymer particles does not exceed 30%, the latex applied to one surface of an organic glass substrate gives, after low-temperature drying, and without the intervention of either coalescing agents or of volatile organic compounds, a continuous film, structured in the form of soft nodules dispersed in a homogeneous, hard matrix, having no surface tack and having good mechanical strength.

In general, hydrophobicity is the property of being insoluble in water or the absence of affinity for water. According to the invention, this lack of affinity may be hierarchized. In fact, the hydrophobicity according to the invention is defined by the solubility parameter ( ) as described in "Properties of polymers" by D. W. Van Krevelen, 1990, $3_{rd}$ edition, page 200. This parameter makes it possible to classify the various polymers according to their affinities for water. According to the invention, a polymer is hydrophobic if its ( ) is less than 26. In addition, if (1) of a polymer 1 is less than (2) of a polymer 2, then polymer 1 is more hydrophobic than polymer 2.

A latex suitable for producing the primer layers according to the invention is a latex which contains neither coalescing agents nor volatile organic compounds and is film-forming by evaporation at a temperature below 40° C. and preferably close to 250° C., the latex being based on core/shell-structured particles of hydrophobic polymers, the particles consisting of:

70 to 90% by weight of at least one polymer P1 with a soft character, having a $T_g$ below 20° C., forming the core, and of 10 to 30% by weight of at least one polymer P2 with a hard character, having a $T_g$ above 50° C., forming the shell.

Preferably, the core has a $T_g1$ below 0° C. and the shell has a $T_g2$ above 60° C. In addition, the core is generally more hydrophobic than the shell.

The latices of the invention are prepared in two steps, by emulsion polymerization of a monomer mixture consisting of:

from 90 to 100% by weight of at least one monomer chosen from group (I) and from 0 to 10% by weight of at least one monomer chosen from group (II).

In general, the latices are prepared by emulsion polymerization in at least two steps, using the polymerization techniques well known to those skilled in the art.

The composition of the mixture of monomers to be polymerized at each step depends on the character that it is desired to give to the polymers formed in that step ($T_g$, hydrophobicity).

According to the invention, the polymer P1 with a soft character and having a $T_g1$ below 20° C., constituting the core of the particles, is prepared in a first step and then the preparation of the polymer P2 having a $T_g2$ above 50° C., constituting the shell with a hard character, is carried out.

It will be noted that, in order for the particles to be perfectly structured, the mixture of monomers to be polymerized in order to form the core must be more hydrophobic than that to be polymerized in order to form the shell.

For each step, the polymerization reaction is preferably carried out in an inert atmosphere in the presence of radical initiators. The initiation system used may be an oxidation-reduction system, a thermal or peroxide system such as sodium bisulphate or di-isopropylbenzene/tert-butyl hydroperoxide, the amounts used being between 0.2 and 1% by weight with respect to the total weight of the monomers, preferably between 0.25 and 0.5% by weight.

The emulsion polymerization reaction according to the invention is carried out at a temperature between 25 and 150° C., the temperature epending on the nature of the initiation system used.

The preparation of the dispersions according o the invention is preferably carried out using a emicontinuous-type process making it possible to limit the derivatives of the compositions which depend on the differences in reactivity of the various monomers. The introduction of the monomers, which are either pure or in the form of a pre-emulsion with some of the water and surfactants, is thus generally carried out over a period of time ranging from 3 hours 30 minutes to 5 hours. It is also useful, although not absolutely necessary, for there to be seeding of 1 to 15% of the monomers. The emulsifying systems used in the emulsion polymerization process are chosen from the range of emulsifiers possessing a suitable hydrophilic/lipophilic balance. The preferred systems consist of the combination of an anionic surfactant, such as sodium lauryl sulphate, nonylphenol ethoxylate sulphates, particularly those with 20–25 mol of ethylene oxide, dodecyl benzene sulphonate and fatty-alcohol ethoxylate sulphates, and of a non-ionic surfactant, such as nonylphenyl ethoxylates, particularly those with 10–40 mol of ethylene oxide, and fatty alcohol ethoxylates.

Advantageously, the substrates or supports are chosen from among:

transparent or non-transparent organic materials;

mineral glasses.

Among transparent organic materials figure especially:

poly(methyl methacrylate) and its copolymers;

impact-modified poly(methyl methacrylate) and its copolymers;

polycarbonates;

styrene/acrylonitrile copolymers;

polystyrene and its copolymers;

polyesters of the PET or PETG type;

cycloolefin copolymers;

poly(vinylchloride) and its copolymers.

Among non-transparent organic materials figure especially:

poly(vinylidene fluoride) and its copolymers;

impact polystyrenes;

ABS copolymers;

or their alloys based on one of the above polymers.

Advantageously, the substrate is made of impact-modified poly(methyl methacrylate) or of its impact-modified copolymers, for example a poly(methyl methacrylate) or one of its copolymers containing at least 10% by weight of an impact modifier of the hard/soft/hard type prepared according to U.S. Pat. No. 2,159,882 or of the soft/hard type prepared according to U.S. Pat. No. 2,092,389.

Advantageously, the substrate is made of polycarbonate.

The mineral or organic glasses are generally those used for lenses and/or windows. Among them may be mentioned the substrates obtained by the polymerization of alkyl methacrylates, particularly $C_1$–$C_4$ alkyl methacrylates, such as methyl (meth)acrylate and ethyl (meth)acrylate; allyl derivatives, such as allyl carbonates of linear or branched, aliphatic or aromatic polyols; thio(meth)acrylics; thiourethanes, and polyethoxylated aromatic (meth) acrylates, such as polyethoxylated dimethacrylate bisphenolates.

Among the recommended substrates, mention may be made of substrates obtained by the polymerization of allyl carbonates of polyols among which mention may be made of ethylene glycol bis(allyl carbonate), diethylene glycol bis (2-methyl carbonate), diethylene glycol bis(allyl carbonate), ethylene glycol bis(2-chloro allyl carbonate), triethylene glycol bis(allyl carbonate), 1,3-propanediol bis(allyl carbonate), propylene glycol bis(2-ethyl allyl carbonate), 1,3-butenediol bis(allyl carbonate), 1,4-butenediol bis(2-bromoallyl carbonate), dipropylene glycol bis(allyl carbonate), trimethylene glycol bis(2-ethylallyl carbonate), pentamethylene glycol bis(allyl carbonate) and isopropylene bisphenol-A bis(allyl carbonate).

The acrylic polymers may also be copolymers formed from methyl methacrylate and from comonomers such as (meth)acrylic acid, alkyl (meth)acrylates, hydroxyalkyl (meth)acrylates, alkoxyalkyl (meth)acrylates in which the alkyl group is, for example, from 1 to 8 carbon atoms, (meth)acrylonitrile, (meth)acrylamide, maleimide, maleic anhydride, substituted or unsubstituted styrene, and a diene such as butadiene. As substrate that can be treated according to the invention, mention may also be made of the above (co)polymers in imidized form, for example polymers having glutarimide groups; the imidized copolymers may also contain methyl methacrylate, methacrylic acid, glutaric anhydride and, possibly, methacrylamide groups, it being possible for the amide or imide groups to carry identical or different substituents in the same chain.

The present invention also relates to:

building and motor-vehicle windows, motor-vehicle headlights, sanitaryware, especially shower trays, wash basins and bathtubs, these comprising the composite materials according to the present invention as described above.

In order to realize the invention, the procedure as described in the examples, which illustrate the invention without limiting the scope thereof, is carried out.

EXAMPLES

Example 1

Preparation of a Latex According to the Invention

The procedure is carried out in a 5-litre reactor fitted with a stirrer, a temperature probe and a jacket through which a heat-transfer fluid flows in order to maintain the reactor at temperature.

Into this reactor, maintained at room temperature, and with stirring, are introduced, after having carried out a nitrogen-degasing step, 1500 g of demineralized water and 4.8 g of disodium phosphate, and then 40.05 g of sodium lauryl sulphate as emulsifier are dissolved in this mixture.

Next, the temperature of the contents of the reactor are raised to 57° C. and, while-maintaining this temperature, 991.75 g of n-butyl acrylate and 9.2 g of 1,4-butanediol diacrylate are then simultaneously added to the said contents.

The temperature of the reactor is raised to 66° C. and 1.3 g of potassium persulphate dissolved in 12.5 g of water and 0.925 g of sodium bisulphite dissolved in 35 g of water are added to the reaction mixture.

After an induction time of approximately 15 minutes, the temperature rises to 107° C.

After this exotherm, a mixture consisting of 98.9 g of n-butyl acrylate and 5.48 g of diallyl maleate, followed by 0.15 g of potassium persulphate dissolved in 25 g of water, are added to the reactor maintained at 80° C. The temperature is maintained at 80° C. for one hour. The elastomeric core, consisting of latex particles having a Coulter diameter of 77 nm, is obtained with a conversion of 97%.

Added to the reaction mixture obtained above, maintained at 80° C., with stirring, is 1 g of sodium formaldehyde sulfoxylate in 5 g of water. Next, over a period of one hour, 279.9 g of methyl methacrylate and, moreover, 0.825 g of diisopropylbenzene hydroperoxide in 275 g of water are added.

The contents of the reactor are maintained at 80° C. for 1.5 hours after the start of the methyl methacrylate addition, and 0.5 g of tert-butyl hydroperoxide and 0.175 g of sodium bisulphite in 10 g of water are added to the said contents.

Next, the reaction mixture is maintained at 80° C. for one hour. After this time, the contents of the reactor are cooled to room temperature.

A latex of the grafted copolymer, the average particle diameter of which is 85 nm and the solids content is 39.9%, is obtained with a conversion of 96.4%. Analysis of the polymer obtained shows that it has 2 glass transition temperatures $T_g$, one located at −38° C. and the other at 105° C.

Example 2

Preparation of a Car's Fixed or Rear Window

The rear window is obtained by thermoforming a sheet of impact-modified polymethyl methacrylate (PMMA) having a thickness of 6 mm (ref. EI 50).

This thermoformed sheet is cut to the size of the future window.

1. The latex BA252 is deposited on a thermoformed sheet by dip-coating using the following operating method:

use of a 39.9% solution of the latex of Example 1;

total immersion of the specimen in this solution followed by removal of the specimen at a rate of 254 mm/minute;

$1^{st}$ drying of the film at room temperature for 20 minutes;

$2^{nd}$ drying in a ventilated oven at 60° C. for 30 minutes.

2. The abrasion-resistant coating is then deposited on the latex-coated specimen using the same deposition process;

use of the thermally crosslinkable abrasion-resistant treatment varnish SILVUE 101 from the company SDC Coating;

total immersion of the specimen in this varnish followed by removal of the latter at a rate of 254 mm/minute;

drying of the varnish for 30 minutes at room temperature;

thermal crosslinking at 85° C. for 4 h.

The mechanical properties of a specimen cut to the required dimensions for the FWI (falling weight impact) test, reference ISO 6603-1 and NF EN 26603-1 standards, are determined.

The total energy needed to fracture the specimen, called $E_T$, is measured. The results are compared with the values obtained on a bare EI 50 specimen (no latex nor abrasion-resistant varnish) and on an EI 50 specimen coated with the same abrasion-resistant varnish but without latex (Example 1).

|  | $E_T$ (J) |
|---|---|
| EI 50 | 46.54 ± 5.9 J |
| EI 50 + SILVUE 101 | 24.5 ± 6.4 J |
| EI 50 + LATEX (Example 1) + SILVUE 101 | 41.34 ± 6.7 J |

An appreciable reduction in the impact trength of the component after depositing the brasion-resistant varnish is noted.

The presence of latex (Example 1), between the component and the varnish allows the initial performance of the bare component to be reestablished.

Example 3

Relating to Stress Cracking

The methods of depositing the latex (Example 1) and the abrasion-resistant varnish SILVUE 101 are those described in the previous example, except that the latex concentration in this case is equal to 19%.

The property of stress-cracking resistance to a mixture of methyl alcohol and ethyl alcohol (in proportions of 1 part per 10 parts) is determined using the UTAC test, reference to Ministerial Decree of Jun. 20, 1983 relating to vehicle windows, pages 6959–6960.

We compared a 6 mm thick EI 50 PMMA specimen with neither latex nor varnish, and EI 50 PMMA specimen coated with the abrasion-resistant varnish and a specimen coated with two layers, namely an intermediate BA252 latex layer and an upper abrasion-resistant varnish layer.

On the bare EI 50 specimen, cracks appear. On the EI 50 specimen coated only with varnish, cracks appear with a certain delay compared with the previous case.

On the EI 50 specimen coated with the BA252 latex and the abrasion-resistant varnish, no cracks were observed.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The foregoing references are hereby incorporated by reference.

What is claimed is:

1. Multilayer composite material comprising a substrate, at least one impact-resistant primer layer deposited on at least one of the faces of the substrate, and at least one abrasion-resistant coating layer deposited on the primer layer, said primer layer comprises an aggregate of multiphase polymer particles, each particle comprising two separate phases:
   a first phase formed by the polymer P1 with a soft character having a glass transition temperature ($T_g1$) below 20° C.; and
   a second phase formed by the polymer P2 with a hard character having a glass transition temperature ($T_g2$) above 50° C.

2. Composite material according to claim 1, wherein the particles are two-phase particles and possess a core/skin structure.

3. Composite material according to claim 2, wherein the core contains the polymer P1 and the shell contains the polymer P2.

4. Composite material according to claim 1, wherein the polymer P1 has a $T_g1$ below 0° C. and the polymer P2 has a $T_g2$ above 60° C.

5. Composite material according to claim 1, wherein the polymer P1 represents 70 to 90% by weight of the particles and the polymer P2 represents from 10 to 30% by weight of the particles.

6. Composite material according to claim 1, wherein the polymer P1 has a hydrophobicity greater than that of the polymer P2.

7. Composite material according to claim 1, wherein the polymers P1 and P2 contain:
   90 to 100% by weight of units obtained by the polymerization of at least one monomer selected from the group (I) consisting of ($C_1$–$C_8$) alkyl esters of (meth)acrylic acid, vinyl esters of linear or branched carboxylic acids, styrene, alkylstyrenes, haloalkylstyrenes, conjugated dienes, (meth)acrylamide, acrylonitrile, vinyl chloride, (meth)acrylic acids and their compounds; and
   0 to 10% by weight of units obtained by the polymerization of at least one monomer selected from the group (II) consisting of allyl esters of α- β-unsaturated monocarboxylic or dicarboxylic acids, conjugated dienes, (meth)acrylates of polyols, polyvinylbenzenes and polyallyl compounds.

8. Composite material according to claim 6, wherein:
   for the polymer P1, the monomers are selected, for the monomers of group (I), from ethyl acryl ate, butyl acryl ate, butadiene, butyl methacryl ate ,and methyl methacrylate and, for the monomers of the group (II), from 1 ,4-butenediol diacrylate, butadiene, ethylene glycol diacrylate, diallyl maleate and allyl methacrylate and
   for the polymer P2, the monomers are selected exclusively from the monomers of the group (I), these comprising methyl methacrylate, butyl methacrylater- and methacrylic acid.

9. Composite material according to claim 1, wherein the substrate is selected from
   transparent or non-transparent organic materials or
   mineral glasses.

10. Composite material according to claim 9, wherein the substrate is made of impact-modified poly(methyl methacrylate) or its copolymers.

11. Composite material according to claim 9, wherein the substrate is made of polycarbonate.

12. Building windows comprising the composite material according to claim 9.

13. Motor-vehicle windows comprising the composite material according to claim 9.

14. Motor-vehicle headlights comprising the composite material according to claim 9.

15. Sanitaryware comprising the composite material according to claim 9.

16. Composite material according to claim 1, wherein in each particle the polymer P1 is dispersed in the form of nodules in a matrix formed by a polymer P2.

* * * * *